United States Patent [19]

Copeland, III

[11] 3,745,542

[45] July 10, 1973

[54] METHOD AND APPARATUS FOR SELECTIVELY ACCESSING A SERIAL STRING OF ENHANCED PROPAGATION PULSE WRITE CIRCUITS

[75] Inventor: John Alexander Copeland, III, Gillette, N.J.

[73] Assignee: Bell Telephone Laboratories, Incorporated, Murray Hill, N.J.

[22] Filed: July 25, 1972

[21] Appl. No.: 274,864

[52] U.S. Cl. .................... 340/174 TF, 340/174 SR

[51] Int. Cl. .................... G11c 11/14, G11c 19/00

[58] Field of Search .............. 340/174 TF, 174 SR

[56] References Cited

UNITED STATES PATENTS

| | | | |
|---|---|---|---|
| 3,646,530 | 2/1972 | Chow | 340/174 TF |
| 3,641,518 | 2/1972 | Copeland, III | 340/174 TF |
| 3,696,347 | 10/1972 | Copeland, III | 340/174 TF |
| 3,711,840 | 1/1973 | Copeland, III | 340/174 TF |
| 3,503,055 | 3/1970 | Bobeck | 340/174 TF |
| 3,706,082 | 12/1972 | Bobeck et al. | 340/174 TF |

*Primary Examiner*—Stanley M. Urynowicz, Jr.
*Attorney*—W. L. Keefauver et al.

[57] ABSTRACT

Selected write circuits in a serial string of enhanced propagation pulse write circuits are activated by modulating the magnetic bias fields in the local vicinity of the selected circuits a sufficient amount to cause only the selected circuits to respond to enhanced propagation pulses, which are normally of insufficient amplitude to activate any of the write circuits.

9 Claims, 2 Drawing Figures

PATENTED JUL 10 1973

3,745,542

METHOD AND APPARATUS FOR SELECTIVELY ACCESSING A SERIAL STRING OF ENHANCED PROPAGATION PULSE WRITE CIRCUITS

BACKGROUND OF THE INVENTION

1. Field of the Invention

This invention relates to single-wall magnetic domain technology and, more particularly, to a method and apparatus for selectively accessing a serial string of conductor pattern, enhanced propagation pulse, write circuits.

2. Prior Art

Two somewhat diversified approaches have developed in the art of single-wall magnetic domain technology for controllably propagating domains about in a layer of material. One approach has led to the development of "field-accessed" apparatus in which domains are moved about in a layer of material in response to a common magnetic field which continually reorients itself in the plane of the layer. The other approach has resulted in the development of "conductor pattern" apparatus for realizing domain movement through localized field gradients. These field gradients are generally produced by applying sequences of pulses to arrays of conductor loops consecutively offset from the positions occupied by the domains.

The principal advantage of the field-access technique lies in the relative facility with which propagation energy is coupled through the common magnetic field to the individual domains. Since all of the domains are controllably moved about in the layer of material under the influence of but a single magnetic field, a minimum of external connections are required to access the individual domains. A distinct disadvantage of the field-access technique is inherent, however, in this same feature. Generally speaking, manipulation of selected patterns of domains cannot be achieved without displacing neighboring patterns of domains in a like manner. Consequently, rather complicated overlay geometries are required to dynamically store or "idle" neighboring domains while selected patterns of domains are being manipulated about in a desired fashion.

The problem of selectivity is largely avoided in the conductor pattern method of propagating domains, because the domains are propagated about in response to localized field patterns which extend over limited areas of the layer of material. As a result, logic and storage operations are readily carried on in selected areas of the layer without inducing movement in neighboring patterns of domains. In the early stages of development, conductor pattern arrays usually comprised serially interconnected sets of conductor loops spaced in a manner to provide three-phase shift register operation. An example of this technique is shown in U.S. Pat. No. 3,460,116, issued Aug. 5, 1969 to A. H. Bobeck, U. F. Gianola, R. C. Sherwood, and W. Shockley.

In practice, however, implementation of the three-phase mode of domain propagation is usually limited by the maximum density of conductors which can be deposited per unit area on the layer of material. This limitation has led to the recent development of a more attractive domain propagation arrangement in which domains are moved about under domain propagation channels which are defined by either magnetically soft rails or serrated grooves parallel to the surface of a layer of suitable magnetic material. Each channel is of a geometry which defines stable domain positions along both sides of the channel, permitting domains along one side of the channel to represent, illustratively, binary ONES and domains along the opposite side of the channel to represent binary ZEROS.

Propagation of domains along the longitudinal axis of the channel is achieved through a single, continuous, serpentine, propagation conductor which crisscrosses the channel in a plane that is parallel to and insulated from the channel. Excitation of the propagation conductor with a train of pulses of alternating polarity generates consecutively offset magnetic fields along the longitudinal axis of the channel. These magnetic fields collectively cause a pattern of domains located under the channel to move along the channel through a sequence of stable domain positions which are defined between consecutive crossings of the channel by the propagation conductor. Each time the conductor is excited with a pulse, a domain moves from one stable position to the next. An example of such an apparatus is shown and described in U. S. Pat. No. 3,636,531, issued Jan. 18, 1972 to J. A. Copeland, III.

A variety of advantages arise when such a domain propagation channel arrangement is closed upon itself in a loop geometry and operated in a mode, known in the art as lateral displacement coding (LDC), in which information is continually recirculated about the loop. The closed loop configuration effectively functions as a "double-rail" logic system with a domain being located along either side of the channel at each stable domain position about the loop. Information is written into the channel at any selected one of the stable domain positions by reducing the lateral dimension of the sepentine propagation conductor at the selected position a predetermined amount with respect to the normal lateral dimension of the propagation conductor at the other domain positions.

Ordinarily, the amplitude of each propagation pulse is sufficiently small and the lateral dimensions of the propagation conductor sufficiently large so that domains propagate from position to position along a particular side of the channel. However, when the lateral dimension of the propagation conductor is reduced at the selected "write" position by a sufficient amount, a magnetically induced force tending to laterally displace domains to the side of the channel with the reduced conductor dimension is generated at the write position each time the propagation conductor is excited with an enhanced pulse of suitable polarity and amplitude. Domains propagating along the opposite side of the channel are displaced at the write position to the side of the channel with the reduced conductor dimension whenever the amplitude of a propagation pulse of a corresponding polarity if appropriately enhanced. Domains propagating along the side of the channel featuring the reduced conductor dimension are not affected by the enhanced pulse. The portion of the propagation conductor defining each write position and the neighboring portions of the propagation channel and layer of material are often conveniently referred to as a basic write circuit. Adjacent but opposed pairs of these basic write circuits are advantageously used to provide for displacement of domains in both directions across the channel. An example of such an apparatus is shown and described in copending application, Ser. No. 207,252, filed Dec. 13, 1971 for J. A. Copeland, III, and assigned to Bell Telephone Laboratories, Incorporated.

The principal drawback to the design of these basic write circuits is that plural ones of the circuits cannot be included in a single information loop without resulting in all of the write circuits being activated by each enhanced propagation pulse. A similar problem is encountered where a single propagation conductor is used to define plural informaion loops and each loop includes one such write circuit. Information cannot be written into one loop without simultaneously writing the same information into all of the loops. Furthermore, it is desirable to have selectable write circuits without increasing the number of propagation conductors, because serpentine propagation conductors are in practice difficult to fabricate and the use of more than one propagation conductor introduces the problem of keeping in synchronism the information circulating about in the respective loops.

Accordingly, it is an object of this invention to provide an enhanced pulse write circuit which can be selectively accessed from a serial string of such circuits without increasing the number of propagation conductors or introducing synchronism problems.

SUMMARY OF THE INVENTION

The invention lies in a method for activating selected write circuit in a serial string of conductor pattern, enhanced propagation pulse, write circuits. The write circuits are activated by modulating the magnetic bias field strength in the local vicinity of each of the selected write circuits a sufficient amount to cause only the selected circuits to respond to propagation pulses having an enhanced amplitude. This method is advantageously implemented by positioning an independently controlled coil in conjunction with an appropriate driving source in the vicinity of each write circuit. Each such coil is oriented so that selective activation of its driving source results in a reduction in the bias field strength in the local vicinity of its associated write circuit. The amplitude of the normal propagation pulses is chosen to be sufficiently small to ensure that none of the write circuits are activated by normal propagation pulses in the presence of either an ordinary or a reduced local bias field. The amplitude of the enhanced propagation pulses is chosen to be sufficiently small to avoid activating any of the write circuits in the presence of a normal local bias field, yet sufficiently large to activate those write circuits which have had their local bias field strengths selectively reduced.

DETAILED DESCRIPTION OF THE INVENTION

Figure 1:
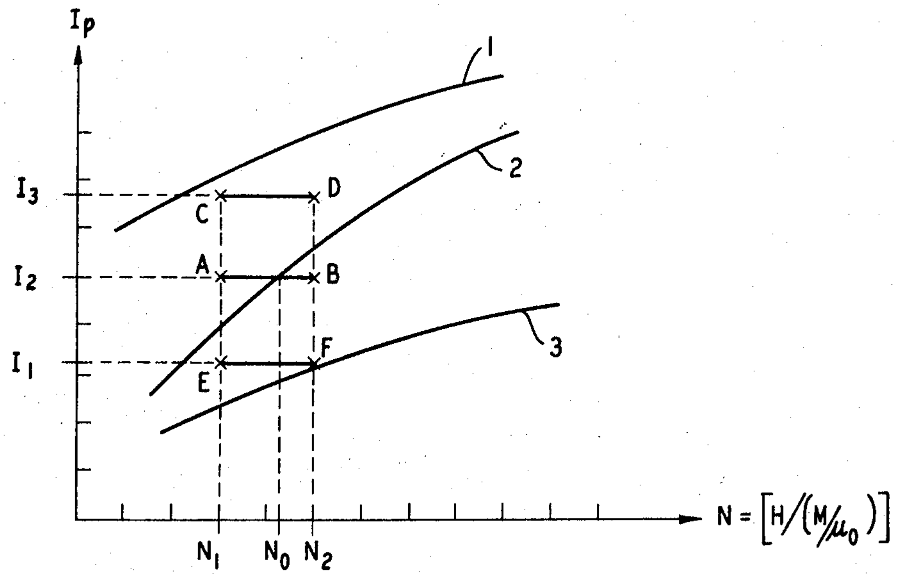
FIG. 1 illustrates the operating characteristics for an enhanced propagation pulse write circuit on a plot of the propagation pulse current-versus-the ratio between the local magnetic bias field strength and the local magnetization (divided by the permeability of free space).

Three curves 1, 2, and 3, which are typical of enhanced propagation pulse write circuits, are shown in FIG. 1. Curve 1 represents a plot of the maximum permissible propagation pulse amplitude, as a function of the ratio N between the local magnetic bias field strength H and the local magnetization M (divided by the permeability of free space $\mu_0$), which can be used to propagate domains and still avoid "writing" at positions other than write circuits along the serpentine propagation conductor. Curve 2 represents a similar plot of the minimum propagation pulse amplitude necessary to effectuate the writing function at a write circuit. Curve 3 represents a plot of the minimum propagation pulse amplitude necessary to propagate domains under the respective positions defined by the propagation conductor.

Normally, enhanced pulse write circuits operate along characteristics such as D–B or A–E, shown in FIG. 1, depending upon whether the ratio of the local bias field strength to the magnetization is $N_2$ or $N_1$, respectively. For instance, operating along characteristic A–E, the ratio would be $N_1$. A normal propagation pulse would have an amplitude $I_1$ and an enhanced propagation pulse would have an amplitude $I_2$. Operation along characteristic D–B requires a ratio of $N_2$, a normal propagation pulse amplitude $I_2$, and an enhanced propagation pulse amplitude $I_3$. In general, however, these circuits can be operated along any characteristic characterized by: (1) a constant local bias field strength; (2) a normal propagation pulse having an amplitude in the region located between curves 2 and 3; and (3) an enhanced propagation pulse having an amplitude in the region located between curves 1 and 1.

The instant invention is designed to operate along the characteristic A–B–F–E, shown in FIG. 1. As is apparent from the figure, points B, F, and E are located in the region located between curves 2 and 3, while point A is located between curves 1 and 2. Using $I_2$ as the amplitude of the enhanced propagation pulses and $I_1$ as the amplitude of the normal propagation pulses, it is further apparent from the figure and the foregoing description of curves 1, 2, and 3 that the enhanced pulses will cause those write circuits having a ratio of the local bias field strength to the local magnetization of $N_1$ to be activated, while those write circuits having a ratio of $N_2$ will fail to be activated. Generalizing, those write circuits having a ratio of local bias field strength to local magnetization which is less than $N_0$ will be activated by an enhanced propagation pulse having an amplitude $I_2$ and those write circuits having a ratio which is greater than $N_0$ will not be activated by such an enhanced pulse. $N_0$ is merely the ratio which corresponds to a pulse current $I_2$ on curve 2. In practice, using standard garnet materials and prior art enhanced pulse write geometries, it has been found that reduction of the local magnetic bias field strength by approximately 4 percent in the vicinity of selected write circuits is sufficient to activate the selected circuits where the ratio of the enhanced propagation pulse amplitude to the normal propagation pulse amplitude ($I_2/I_1$) is about 2.

Thus, any selected one or group of the write circuits in a serial string of enhanced pulse write circuits which is biased at a ratio of $N_2$ can be activated by an enhanced pulse of amplitude $I_2$ by concurrently reducing the ratio from $N_2$ to $N_1$ in the local vicinity or neighborhood of the selected circuit(s). As a result, by providing independently controlled means for appropriately modulating the bias field strength in the neighborhood of each of the write circuits, it is possible to employ but a single propagation conductor to service an entire conductor pattern circuit comprising plural write circuits without sacrificing the ability to selectively activate predetermined ones of the write circuits.

Figure 2:
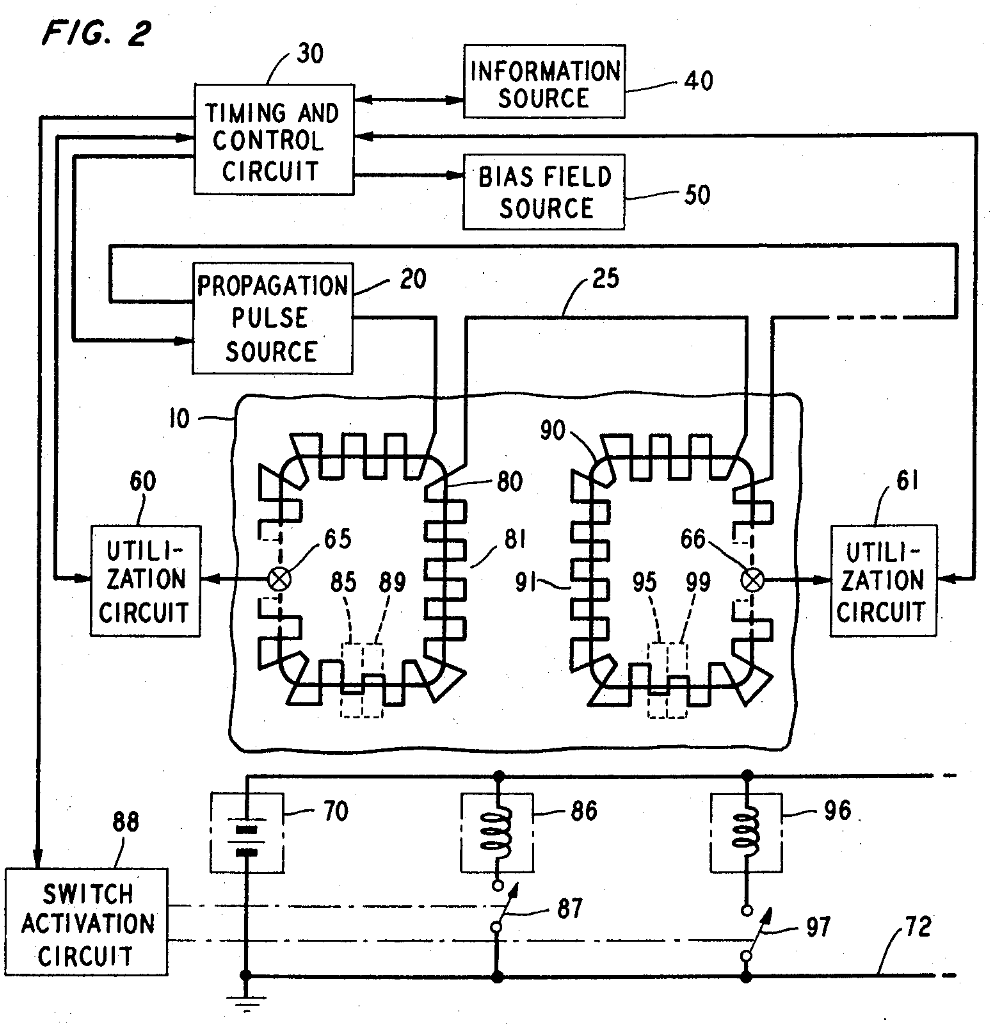
FIG. 2 depicts a schematic diagram of a system for accessing selected write circuit in a serial string of enhanced propagation pulse write circuits.

An example of such a circuit is shown in FIG. 2. The figure illustrates a multiloop, conductor pattern, storage arrangement which is served by a single serpentine propagation conductor 25 superimposed upon the surface of a layer of material 10 in which single-wall magnetic domains are movable. Two loops 81 and 91 are depicted in the figure; although the arrangement may be extended to feature more than two of such loops.

Loop 81 is principally defined by a domain propagation channel 80 located on the surface of material 10. Channel 80 may be either a magnetically soft rail on the surface of the layer of material or a serrated groove etched in the surface of the layer of material; loop 91 is similarly defined by domain propagation channel 90. The respective stable domain positions around each loop are defined by propagation conductor 25, as shown in FIG. 2. Each of loops 81 and 91 has a pair of adjacent but opposed serially connected enhanced pulse write circuits, loop 81 including write circuits 85 and 89 and loop 91 comprising write circuits 95 and 99. Utilization circuits 60 and 61 and domain sensor 65 and 66, which are respectively connected in propagation channels 80 and 90, are included to provide the capacity to independently retrieve information from loops 81 and 91, respectively.

In addition, a timing and control circuit, represented by block 30, an information source, represented by block 40, a bias field source, represented by block 50, a switch activation circuit, represented by block 88, and a propagation pulse source, represented by block 20, are included to provide the storage arrangement with the necessary timing and control functions and an interface with external circuits which utilize the information storage and retrieval capabilities of the storage arrangement.

Each pair of adjacent write circuits is physically associated with a bias field modulation circuit. One embodiment of such a modulation circuit comprises a coil which is connected in a loop with a DC source and an independently controlled switch. Write circuits 85 and 89 in loop 81 are associated with such a loop, which comprises coil 86, switch 87, and DC source 70. Write circuits 95 and 99 are associated with a similar loop which includes coil 96, switch 97, and DC source 70.

Alternatively, a single conductor or pair of conductors is used to provide the required bias field modulation. In such an embodiment, the conductors are located in the vicinity of the write circuits and oriented to reduce the local bias fields near the selected write circuits when the conductors are selectively pulsed. Functionally, however, this method of providing selective bias field modulation is substantially the same as that shown in FIG. 2.

The circuit functions as follows. Assume that it is desired to displace a first domain from the outer side of loop 81 where it represents, for example, a propagating binary ONE, to the inner side of loop 81, where it represents a propagating binary ZERO. Also assume that, at the same time, a second domain is propagating around the outer side of loop 91 through corresponding positions and in synchronism with the first domain in loop 81. As a result, the first domain in loop 81 will arrive at write circuit 89 at the same instant the second domain in loop 91 arrives at write circuit 99. At this instant, if the magnetic bias field strength is sufficiently strong in the local vicinities of write circuits 89 and 99, excitation of propagation conductor 25 with a pulse of either normal or enhanced amplitude would result in neither the first nor the second domains being displaced to the inner sides of loops 81 and 91, respectively.

However, provided coil 86 is of suitable size and is oriented in a direction to cause a sufficient reduction in the local magnetic bias field about write circuit 89 in accordance with the operating characteristics shown in FIG. 1 and described in the accompanying text, the first domain will be displaced at write circuit 89 to the inner side of loop 81 in response to the closure of switch 87 and the excitation of conductor 25 with an enhanced propagation pulse. Unless switch 97 is similarly closed to excite coil 96, the second domain will fail to be displaced to the inner side of loop 91 at write circuit 99. It should therefore be apparent to one skilled in the art that any combination of the write circuits can be selectively activated according to this technique of modulating or reducing the bias fields in the local vicinities of the selected write circuits by providing independent means for controlling the local bias field strengths at each of the write circuits.

Although the present invention has been described in connection with particular applications and embodiments thereof, it is intended that all additional modifications, applications, and embodiments which will be apparent to those skilled in the art in light of the teachings of the invention be included within the spirit and scope of the invention.

What is claimed is:

1. In combination:

a layer of material in which single-wall magnetic domains are movable;

means for defining a domain propagation channel in said layer;

means for providing a magnetic bias field in said layer;

a conductor pattern having first and second geometries defining consecutive domain positions along said channel;

means for selectively modulating the local bias field a predetermined amount in the vicinity of each of said positions defined by said second geometry; and means for applying first and second pulses to said conductor pattern, such that (1) a domain at any of said positions defined by said first geometry moves along one side of said channel to an adjacent position in response to one of said first or second pulses, (2) a domain at any of said positions defined by said second geometry and having an unmodulated local bias field moves along one side of said channel to an adjacent position in response to one of said first or second pulses, and (3) a domain at any of said positions defined by said second geometry and having a modulated local bias field switches sides of said channel and moves to an adjacent position in response to one of said second pulses.

2. The combination in accordance with claim 1 to which said first geometry comprises a looping pattern that twice crosses said channel and extends a first predetermined lateral distance from the longitudinal axis of said channel; and said second geometry comprises a looping pattern that twice crosses said channel and extends a second predetermined lateral distance less than said first lateral distance from the longitudinal axis of said channel.

3. The combination in accordance with claim 2 in which said first pulses have a first predetermined amplitude; and said second pulses have a second predetermined amplitude greater than said first amplitude.

4. The combination in accordance with claim 3 in which said modulating means includes means for independently reducing the strength of the magnetic bias field by a predetermined amount in the local vicinity of each of said write circuits.

5. The combination in accordance with claim 4 in which said second lateral distance is sufficiently large to preclude lateral displacement of domains across said channel at positions defined by said second geometry in response to either said first or second pulses when the magnetic bias field in the local vicinities of such positions remains at normal strength; and said second lateral distance is sufficiently small to allow displacement of domains across said channel at positions defined by said second geometry in response to said second pulses when the magnetic bias field in the local vicinities of such positions has been reduced a predetermined amount by said modulating means.

6. The combination in accordance with claim 5 in which said first lateral distance is sufficiently large to preclude lateral displacement of domains across said channel at positions defined by said first geometry in response to either said first pulses or said second pulses and irrespective of whether the magnetic bias field in the local vicinity of such positions has been reduced by said modulating means.

7. A method for activating a selected write circuit in a domain propagation conductor arrangement which defines plural enhanced propagation pulse write circuits connected in a serial conduction path, comprising the steps of:

biasing each of said write circuits at a magnetic field strength sufficient to prevent activation of any of said write circuits by either enhanced or normal propagation pulses;

modulating the bias field strength in the local vicinity of said selected write circuit by a predetermined amount sufficient to cause said selected circuit to be activated by an enhanced propagation pulse; and exciting said conducting path with an enhanced propagation pulse.

8. The method in accordance with claim 7 in which said modulating step results in reduction of the local bias field strength of said selected circuit by a sufficient amount to reduce the minimum propagation pulse amplitude necessary to activate said selected circuit to a level less than the amplitude of an enhanced propagation pulse but greater than the amplitude of a normal propagation pulse.

9. In combination:

a layer of material in which single-wall magnetic domains are movable;

means for defining a domain propagation channel in said layer;

a conductor having a plural first and second geometries defining domain positions along both sides of said channel;

means for providing a magnetic bias field of a predetermined strength in said layer of material;

means for controllably modulating the strength of said bias field by a predetermined amount in the vicinity of a selected one of said positions defined by said second geometry; and means for providing first and second pulses to said conductor, such that in response to one of said first pulses a domain moves along one side of said channel and in response to one of said second pulses a domain moves from one side to the other side of said channel at selected ones of said positions defined by said second geometry where said bias field has been controllably modulated.

* * * * *